United States Patent [19]

Kemp

[11] Patent Number: 4,588,164
[45] Date of Patent: May 13, 1986

[54] THROUGH CONDUIT GATE VALVE

[76] Inventor: Willard E. Kemp, 1035 Dairy Ashford Rd., Suite 249, Houston, Tex. 77079

[21] Appl. No.: 493,589

[22] Filed: May 11, 1983

[51] Int. Cl.[4] ...................... F16K 3/316; F16K 27/04
[52] U.S. Cl. ................................. 251/327; 251/329; 251/367
[58] Field of Search .................. 251/329, 367, 327

[56] References Cited

U.S. PATENT DOCUMENTS

| | | | |
|---|---|---|---|
| 3,743,246 | 7/1973 | Heller | 251/329 X |
| 4,440,381 | 4/1984 | Tipton, Jr. | 251/329 X |
| 4,443,920 | 4/1984 | Oliver | |

FOREIGN PATENT DOCUMENTS

| | | | |
|---|---|---|---|
| 896584 | 11/1953 | Fed. Rep. of Germany | 251/367 |
| 960139 | 3/1957 | Fed. Rep. of Germany | 251/329 |
| 489602 | 7/1938 | United Kingdom | 251/367 |

OTHER PUBLICATIONS

Sales Brochures—copies attached, W-K-M Cat. No. 82, pp. 8605, 8607 & 8606 (1982).
Gulfco Cat. No. 108, pp. 11, 12 & 13 (1981).
Demco Cat. G7-79, pp. (2) (1979).
Vetco Tech. Bul. VTB 3-01, pp. (3) (1981).
Newco Cat. pp. 25 & 36 (1982).
Gray Tool Co., Cat. p. 3185 (1982).

*Primary Examiner*—Arnold Rosenthal
*Attorney, Agent, or Firm*—Vaden, Eickenroht, Thompson & Jamison

[57] ABSTRACT

A through-conduit, double-wedging parallel seat gate valve. The valve has a monolithic body forming a spherical segment with a cylindrical flow passage and flange end connections. The body has a transverse chamber mounting a rectangular gate moved across the passage between opened and closed positions. The chamber has an obround cross section with parallel sides facing the sides of the gate and rounded ends facing the edges of the gate. Integral parallel guide surfaces on the body separate the rounded ends from the parallel sides, and these guide surfaces engage the edges of the gate. Replaceable seats about the flow passage seal to the sides of the gate. Upper and lower closure members are releasably secured on annular sealing surfaces on the body and enclose the gate within the chamber. The flanges and body can have the same radii as the bar stock from which the body is machined. The guide surfaces are tangents at the intersection of semicylindrical grooves in the parallel sides with the rounded ends. These grooves facilitate removal of the seats.

30 Claims, 6 Drawing Figures

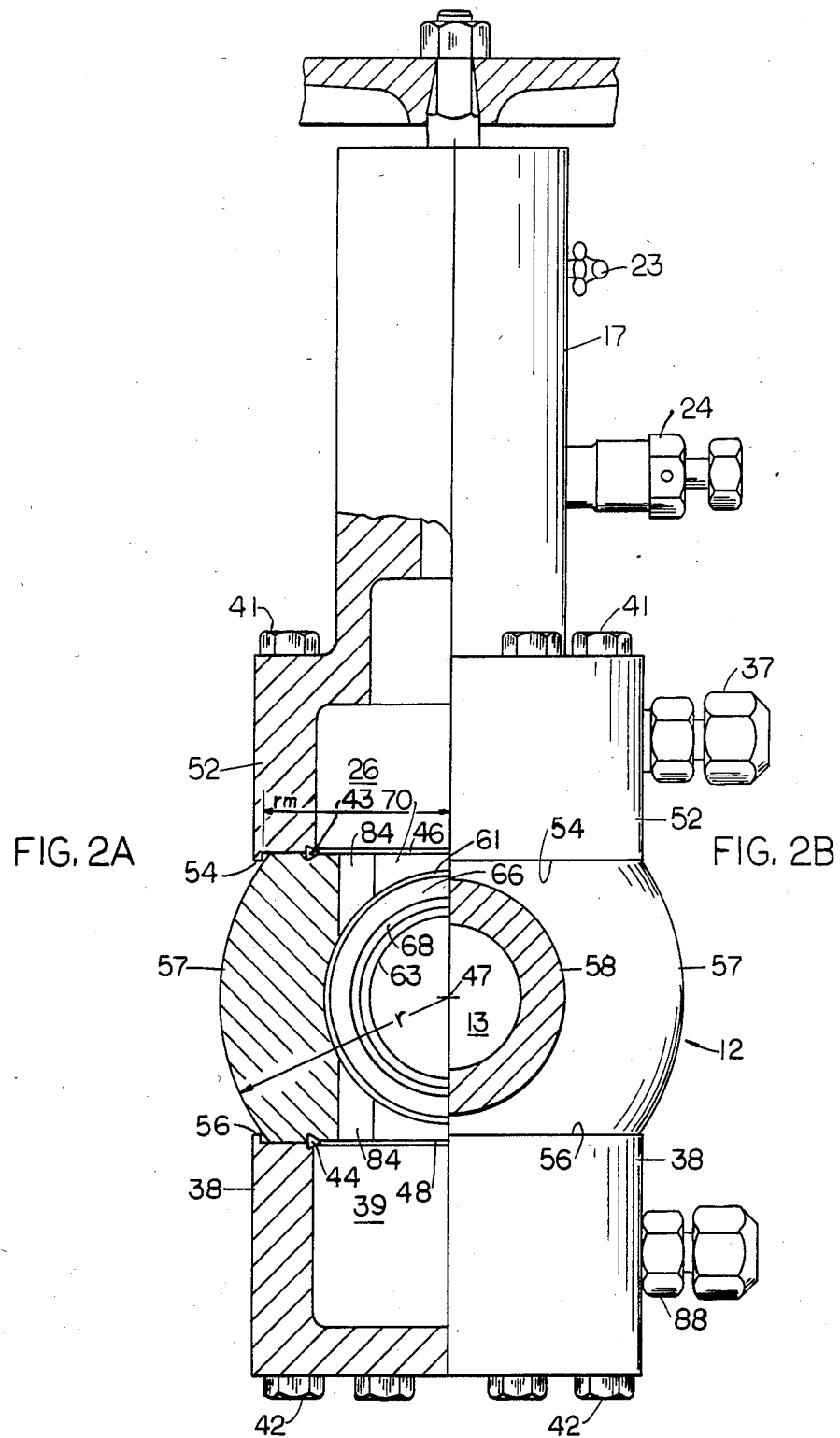

THROUGH CONDUIT GATE VALVE

BACKGROUND OF THE INVENTION

1. Field of the Invention

This invention relates to valves for regulating fluid flows, and it more particularly relates to reciprocating gate valves.

2. Description of the Prior Art

The designs of valves have been well perfected for many years, and these designs are conformed to the type of flow control in which the valve is to be employed. One common commercial valve is the gate valve wherein a gate is reciprocated across a flow passage to regulate fluid flows.

The present invention concerns the gate valve with reciprocating gate such as used in high-pressure wellhead service. More particularly, this gate valve design is of parallel seats. The complementary gate parts have inclined plane devices which convert stem force to axial force for pressing the gate parts against the seats when the valve is adjusted into opened and closed position.

There are many gate valves available for wellhead service. Examples of these through conduit gate valves are the (1) W-K-M "Pow-R-Seal", (2) Gulfco API Gate Valve, (3) Demco type N, (4) Vetco Manual Gate Valve, (5) Gray Gate Valve Model 5, and (6) Newco Gate Valves. All valves of this type have removeable/replaceable seats, separate gate guide members to control gate reciprocation and closures (bonnet and lower cap). As a result, the valve body and gate guide members are relatively complicated in manufacture and as a result, greatly increase the costs of these gate valves.

In these gate valves of the through-conduit type, the gate assembly is always in contact with the seals to protect them from abrasion and corrosion, and also to keep the gate from vibration in fast fluid flows. When the valve is in opened position, the flow passes through a hole in the gate. The hole is usually of the same size as the flow passage in the valve body. With the valve in its closed position, an imperforate part of the gate rests between the seals and effectively blocks fluid flow through the valve body.

Because of the service requirements on wellheads, these valves have large safety factors in their design. As a result, the valves are heavy. For example, a 5000 psi model of 2 inch (i.e., of flow channel) will weigh about 150 pounds, and a 6 inch model will weigh about 1000 pounds.

The valve bodies on prior gate valves for use on wellheads have in general been forged or cast so as to obtain large number production cost advantages. Further, the dimensions of the closures etc., were determined previously on the necessary strength criterion for the valve. Stated in a different way, the diameter of flanges on the valve bore no relationship to the sizes of the sealing surfaces on the closures, gate assemblies, etc.

In the present gate valve, the valve body can be machined easily and completely starting with bar stock having a diameter equal to end connection flanges on the valve. The valve body has integral gate guides, and all annular sealing surfaces for the closures (bonnet and lower cap) have maximum diameters of fixed relationship to the flanges. With this arrangement, the annular bearing surfaces on the body are less than the bolting bearing surfaces on the closures.

SUMMARY OF THE INVENTION

In accordance with this invention, there is provided a unique through-conduit, double-wedging, parallel-seat gate valve.

The valve has a monolithic body containing a cylindrical flow passage extending between pipe flanges for connecting the valve into a piping system. A transverse chamber extends across the flow passage. A rectangular gate is mounted within the transverse chamber and arranged to be moved transversely across the flow passage between opened and closed positions. The transverse chamber has an oblong cross section with parallel sides acting as gate guides to the sides of the gate and rounded ends facing the edges of the gate. Integral parallel strip guide surfaces on the body separates the rounded ends from the parallel sides. The strip guide surfaces engage as gate guides the edges of the gate. Replaceable annular seats are mounted in annular recesses formed within the parallel sides and about the flow passage. The seats engaging in fluid tightness the sides of the gate. Upper and lower closure members are releaseably secured to said body for receiving the gate in its movement between opened and closed positions.

In one preferred form, the valve body is machined from bar stock of a diameter equal in size to the pipe flanges. The closure members rest on annular sealing surfaces formed on the body having radii of fixed relationship to the flanges, and this body is a spherical segment with the same radius at its maximum diameter.

In another preferred form, the strip guide surfaces are provided by semicylindrical transverse grooves at the meeting between the parallel sides and rounded ends about the transverse chamber. More particularly, the strip guide surfaces are the tangents at the intersection of the grooves with the rounded ends.

DESCRIPTION OF THE DRAWINGS

FIG. 2A is a partial vertical section taken along line 2A—2A of the valve in FIG. 1A;

FIG. 2B is a vertical section taken along line 2B—2B of the valve in FIG. 1B;

In these drawings, the several embodiments have common elements of construction, and these elements will carry like numerals to simplify description of the present gate valve invention.

DESCRIPTION OF PREFERRED EMBODIMENTS

Figures 1A, 1B:
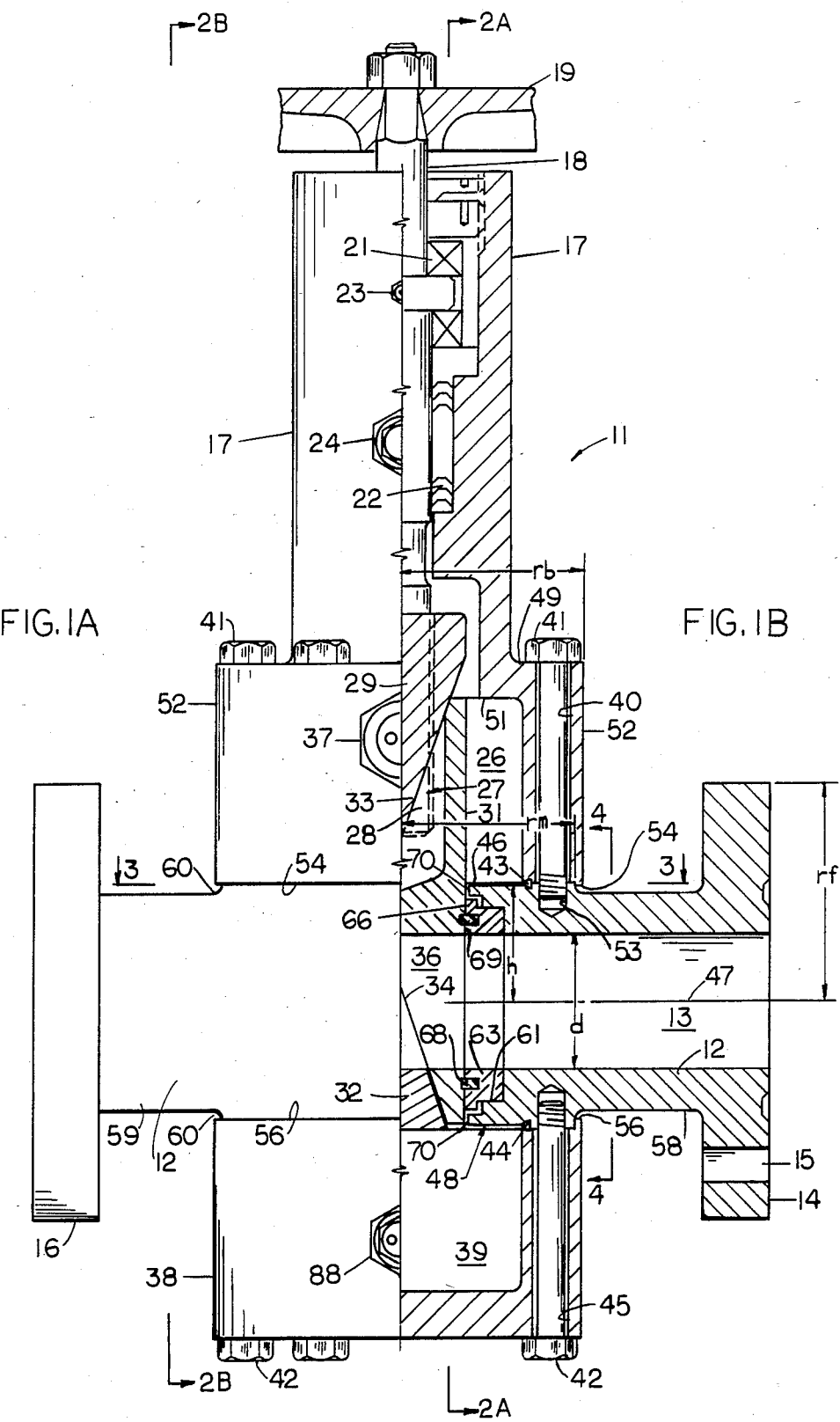
FIG. 1A is a partial side elevation of the gate valve of this invention.
FIG. 1B is a partial vertical section of the gate valve of this invention.

Referring to the drawings, and particularly to FIGS. 1A and 1B, and 2A and 2B, there is shown a reciprocating gate valve of this invention. The valve 11 has a body 12 with a cylindrical flow passage 13 extending therethrough between end parts for connection into a piping system. These end parts may be API flanges 14 and 16 carrying the usual holes 15 to accept bolts etc., for piping connections. The flanges have equal radii "rf".

The body 12 carries a bonnet or upper closure 17 which houses the usual stem 18 that can be rotated by an external handwheel 19. The stem 18 extends through the tubular closure 17, and mounts within bearings 21 and fluid tight chevron packings 22. A Zerk fitting 23 allows greasing of the bearings 21. A pressure fitting 24 allows injections of a lubricant/sealant into the packing 22.

The lower portion of the closure 17 carries a limited transverse chamber 26 into which is received the upper portion of a gate assembly 27 when the valve 11 is in its opened position. More particularly, the gate assembly is reciprocated upon the threaded end 28 of the stem 18 by its threaded mounting within the nut 29 carried by the gate assembly.

The gate assembly 27 is composed of complementary gate discs or parts 31 and 32 that engage upon inclined plane surfaces 33 and 34. A loading spring (not shown) maintains these gate parts in tight engagement. As a result, these inclined plane surfaces force the gate parts laterally apart against fluid seats when the gate assembly is in its opened or closed positions. The gate parts 31 and 32 are imperforate in their upper extremity while their lower portion carries a round opening 36 aligning with, and of the same diameter "d" as the flow passage 13. A pressure fitting 37 may be provided the closure 17 for injecting lubricant/sealant into the gate assembly 27.

The body 12 carries a cap or tubular lower closure 38 which has a limited transverse chamber 39 in which the gate assembly is received when the valve is in closed position. The upper and lower closures are secured by suitable bolt openings 40 and 45 to the body 12 by cap bolts 41 and 42, respectively. Also, fluid tight connection between the closures and the body are provided by metal seal rings 43 and 44 resting in the usual seal grooves in the mating parts.

More particularly, the upper closure 17 seats upon planar or flat annular sealing surface 46 provided upon the body 12. The surface 46 has a maximum radius "rm". In addition, the surface 46 rests in a plane parallel to the axis 47 of the flow passage 13, but spaced therefrom a distance "h". The lower closure 38 similarly seats upon a planar or flat annular sealing surface 48 provided on the body 12. The surface 48 can also be parallel with and spaced from the axis 47 a distance "h".

The cap bolts 41 abut a planar or flat bearing surface 49 which has a maximum radius "rb". This surface resides in a plane parallel to sealing surface 46, but it is spaced above the upper end 51 of the chamber 26. As a result, the cap bolts 41 transverse the closure 17 and threadedly secure into threaded openings 53 within the sealing surface 46. The portion 52 of the upper closure 17 traversed by the cap bolts 41 can be cylindrical in external configuration. Preferably, the open end of the portion 52 has a circumferential rim 54 that overhangs the sealing surface 47. The rim 54 may provide a receptical for grease, etc. to exclude debris, water or other corrodant and also it assists in alignment of the closure 17 onto the body 12. The lower cover 38 may also carry a similar rim 56. The cylindrical portions 52 and 38 with their rims 54 and 56 provide smooth external surfaces transition to the body 12.

The body 12 can be manufactured from forgings or castings, but it also can be manufactured efficiently from bar stock of a suitable metal, such as wrought iron or stainless steel. For this purpose, a length of cylindrical bar stock is secured at an adequate length and of a radius "r". Preferably, the radius "r" is substantially equal to the radius "rf" of the flanges 14 and 16. The bar stock is axially bored to produce the flow passage 13. Now, the flanges 14 and 16 are machined onto the bar stock. The central portion 57 of the body 12 about the gate assembly 27 is turned into a spherical segment shape having a maximum radius "r" in a plane perpendicular to the axis 47 of the flow passage 13 (best seen in FIG. 3). The intermediate body portions 58 and 59 are now turned cylindrically between the central body portion 57 and the flanges 14 and 16.

Preferably, the body 12 has a relationship wherein the flanges 14 and 16, body portion 57 and the annular sealing surfaces 46 and 48 have the radii of a fixed relationship. For this result, the annular sealing surfaces 46 and 48 are cut onto the body forming parallel planes of detachment, which planes are perpendicular to the axis of gate movement and also parallel to the axis 47 at a distance "h" therefrom. Stated in another manner, these sealing surfaces in their maximum radii "rm" are equal in diameter to a circle formed by truncating body portion 57 at the distance "h" from the axis 47 forming a spherical segment.

More particularly, the relationship above stated conforms to the formula $r^2 = (rm)^2 + (h)^2$ relative to the maximum radius of the spherical body portion 57.

Also, the relationship in the body 12 relative to the flow axis 47 conforms to the formula $$h^2 = (2d)^2 - (rm)^2$$

Additionally, the relationship in the body 12 relative to the flange radii conforms to the formula $(rf)^2 = (rm)^2 + (h)^2$.

With the valve 11 constructed in accordance to the above relationships, the maximum strength from a machined bar stock is produced while the valve remains very compact in the body 12.

Figure 4:
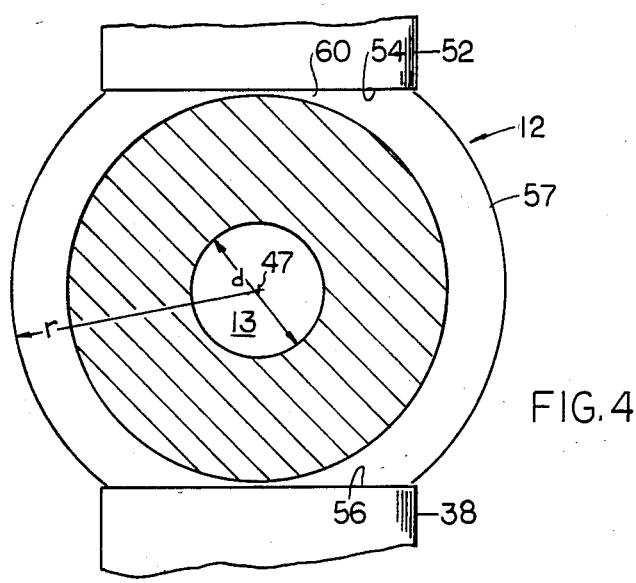
FIG. 4 is a vertical section taken along line 4—4 of the valve in FIG. 1B.

As shown, the truncation of the body 12 leaves only a small curve 60 from portion 57 exposed below the closures. However, the larger the valve diameter, the greater the curve 60 from the portion 57 exposed below the closures as seen in FIG. 4.

Also, the annular bearing surface 49 has a maximum radius "rb" at the cap bolts that is greater than the maximum radius "rm" of the annular sealing surface 46. Thus, the cap bolts are arranged in a circle less than the radii "rb" and "rm". This arrangement permits a very compact arrangement of the closure 17, and also, if desired, of the closure 38.

Figure 3:
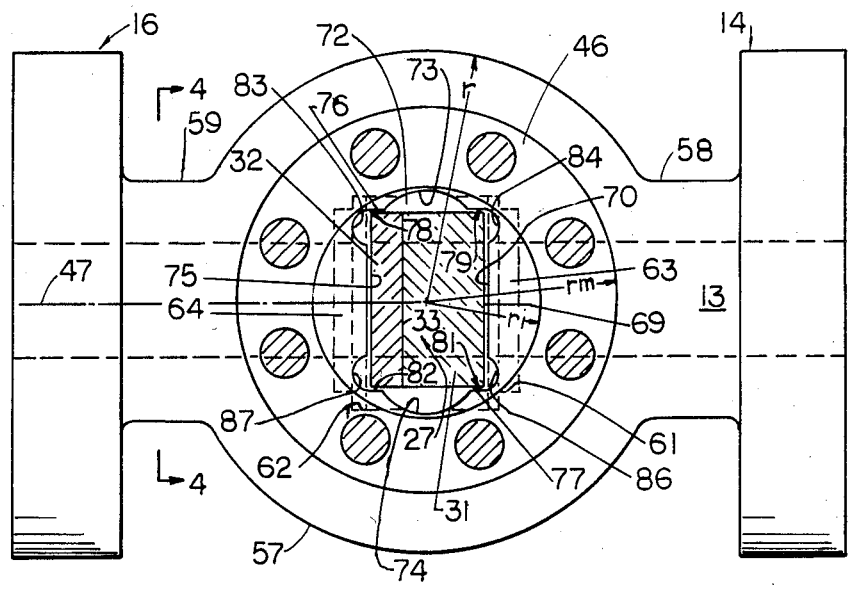
FIG. 3 is a cross section taken along line 3—3 of the valve in FIGS. 1A—1B.

As mentioned, the gate assembly 26 cooperates with seals for fluid tight conditions at the opened and closed positions of the valve 11. For this purpose, as best seen in FIG. 3, stepped counterbores or annular recesses 61 and 62 are formed within the body 12 about the flow passage. Annular seals 63 and 64 are securely mounted within these recesses 61 and 62, respectively. These seals have reduced diameter stepped portions engaging fluid tightly within the recesses. The enlarged diameter portions of the seals have flat faces 66 and 67 parallel to the sides of the gate ports 31 and 32 and include resilient sealing rings 68 to produce the fluid tight seal to the gate assembly. The flat faces of the seals provide gate guide surfaces to the sides 69 and 71 of the gate parts 31 and 32. As in the usual gate valve, these seals 63 and 64 can be removed and replaced as necessary for proper valve operation.

The gate assembly 27 is contained within a transverse chamber 72 within the body 12. The chamber 72 has a uniform oblong cross section taken transversely to the axis of gate movement in the body 12. Preferably, the chamber 72 has an obround cross section formed in the body 12 with the parallel sides 70 and 75 facing the sides 69 and 71 of the gate assembly 27. The parallel sides 70 and 75 will act as gate guides. Also, the chamber 72 has equal radii rounded ends 73 and 74 facing the edges 76 and 77, respectively, of the gate assembly 27.

In addition, the body 12 integrally carries parallel strip guide surfaces 78, 79, 81 and 82 for engaging the edges 76 and 77 of the gate assembly 27. Thus, the gate assembly is guided axially, and confined laterally by the faces 66 and 67 of the seals and the strip guide surfaces 78, 79, 81 and 82. Since these strip guide surfaces are integral with the body 12, the body is much more compact about the chamber 72 than conventional gate valves having separate gate guide shoes or members.

Preferably, the strip guide surfaces are provided by transverse parallel grooves 83, 84, 86 and 87 which extend inwardly into the body 12. These grooves are positioned between the parallel sides 70 and 75, and the rounded ends 73 and 74. These grooves extend in the body 12 along the parallel sides 70 and 75 and preferably intersect the counterbore enlarged diameter recesses 61 and 62, immediately adjacent the chamber 72. As a result, the large diameter portion of the seals 63 and 64 are exposed at the grooves. With the gate assembly 27 removed from the body 12, a screw driver or other tool inserted into these grooves can be used to pry the seals from the counterbored recesses formed into the parallel sides 70 and 75. Replacement seals are reinserted into these recesses and driven firmly into the recesses 61 and 62 from the chamber 72.

The grooves 83, 84, 86 and 87 are preferably semicylindrical in cross section with their locus positioned in planes aligned with the faces 66 and 67 of the seals (and slightly inwardly of the parallel sides 70 and 75). Also, the locus of these semicylindrical grooves are placed at about the meeting of the parallel sides 70 and 75 with the rounded ends 73 and 74. These semicylindrical grooves have radii such that the strip guide surfaces 78, 79, 81 and 82 are on the tangent of the intersection of the grooves with the rounded ends.

The chamber 72 and grooves 83, 84, 86 and 87 are readily machined into the body 12, especially when formed from the bar stock. After the annular sealing surface 46 and 48 have been cut, round holes can be bored into the body 12 at the locus of the semicylindrical grooves and they extend between the annular sealing surfaces. Now, a cylindrical milling cutter with a diameter slightly less than the distance between the parallel sides 70 and 75 is employed to cut out of the body the chamber 72 with its parallel sides and rounded ends. As a result, the round holes become after milling the semicylindrical grooves between the parallel sides and the rounded ends with the tangents at their intersection being the parallel strip guide surfaces 78, 79, 81 and 82. Not only are these strip guide surfaces integral with the body 12, but they are formed simultaneously with cutting of the chamber 72. The parallel sides 70 and 75 can now be counterbored to produce recesses 61 and 62.

As best seen in FIG. 3, the annular sealing surfaces 46 and 48 have a minimum radius "ri" and enclose the chamber 72, the semicylindrical grooves and the gate assembly 27. More particularly, no portion of the gate assembly and chamber 72 not concentric with the passage 13 extend laterally outside of a cylindrical envelope prescribed by this minimum radius "ri". Thus, the valve body 12 is extremely compact, yet strong but economically machined from bar stock.

The exterior surface of the body 12 can be machined into the flanges, portion 57 and the cylindrical body portion 58. As seen in FIGS. 2B, 3 and 4, the radii of the body decrease as a function with the distance from the portion 57 towards the portion 58. As the size of the valve increases, so does the radius "r" of the body 12. In addition, the curves 60 merge smoothly into the annular sealing surfaces 46 and 48.

A pressure fitting 88 on the closure 38 allows injection of lubricant into chamber 39.

From the foregoing, it will be apparent that there has been provided a novel reciprocating gate valve for controlling fluid flows, especially at wellheads, that is compact, easily machined from bar stock and has integral gate guides but yet is as strong and serviceably as conventional gate valves employing body castings. It will be appreciated that certain changes and alterations in the present gate valve can be made without departing from the spirit of this invention. These changes are contemplated by and are within the scope of the appended claims which define the invention. Additionally, the present description is intended to be taken as an illustration of this invention.

What is claimed is:

1. In a through-conduit gate valve having a body containing a cylindrical flow passage extending therethrough between end parts for connecting said valve into a piping system;
   a transverse chamber through said body extending across said flow passage, and said chamber housing a gate moved transversely across said flow passage between open and closed positions, first and second closure members releaseably secured on annular seal surfaces to said body for enclosing said chamber;
   an elongated gate having parallel sides and edges with a substantially rectangular cross section, and said gate having in longitudinal spaced relationship an imperforate portion and a perforate portion with an opening conforming to said flow passage;
   said body carrying removable annular seats releaseably mounted in annular recesses about said flow passage and said seats engaging fluid tightly the parallel sides of said gate in its open and closed positions:
   gate guide means in said body for controlling transverse and lateral movement of said gate between open and closed positions;
   one of said closure members receiving said imperforate portion of said gate when in its open position;
   the improvement comprising:
   (a) said body having unitary gate guide means wherein said transverse chamber has a symmetrical oblong cross section defined by parallel sides facing the sides of said gate and rounded ends adjacent to the edges of said gate;
   (b) transverse gooves extending inwardly into said body from said transverse chamber and between said parallel sides and said rounded ends; and
   (c) said transverse grooves within said rounded ends providing parallel strip guide surfaces for engaging the edges of said gate during its movement between opened and closed positions.

2. The gate valve of claim 1 wherein said transverse grooves are semicylindrical with said strip guide surfaces being on the tangent of said semicylindrical grooves intersecting with said rounded ends of said transverse chamber.

3. The gate valve of claim 1 wherein said transverse grooves extend into said annular recesses mounting said annular seats whereby a tool, such as a screwdriver, can be used to pry said annular seats from said body.

4. The gate valve of claim 3 wherein said annular recesses are reduced diameter stepped surfaces such as stepped counterbores and said transverse grooves extend only into the stepped surface of said annular recess immediately adjacent said transverse chamber.

5. The gate valve of claim 2 wherein said transverse chamber has an obround cross section and said semicylindrical groves have their centers substantially aligned in planes parallel with said sides of said transverse chamber and their centers also residing substantially at the meeting of said sides with said rounded ends whereby said strip guide surfaces are on the tangent of said semicylindrical grooves intersection with said rounded ends.

6. The gate valve of claim 5 wherein said annular recesses are reduced diameter stepped surfaces and said semicylindrical grooves extend only into the stepped surface of said annular recesses immediately adjacent said transverse chamber, and said annular seats have complementary reduced diameter surfaces to be received into said annular recesses.

7. The gate valve of claim 1 wherein said first closure member includes a limited transverse chamber to accept a substantial movement of said gate thereinto between opened and closed positions.

8. The gate valve of claim 7 wherein said first closure member carries a planar annular bearing surface at one end of said limited transverse chamber remote from said annular sealing surface thereon, and a plurality of threaded fasteners extend from said annular bearing surface through said first closure member and then integrally secure into said body within said annular sealing surfaces.

9. The gate valve of claim 8 wherein said first closure member carries an encircling rim projecting about said annular sealing surface to provide a smooth transition between said first closure member and said body.

10. The gate valve of claim 1 wherein said body has a central portion containing forming a spherical segment and containing said transverse chamber, said first and second closure members are releaseably secured along planes of detachment upon annular sealing surfaces surrounding said transverse chamber on said body and said annular sealing surfaces are parallel with said flow passage and transverse to gate movement within said transverse chamber.

11. The gate valve of claim 10 wherein said central portion forming a spherical segment has a maximum radius "r" in a plane perpendicular to said flow passage, each said annular sealing surface has a maximum radius "rm" and the planes of detachment are spaced a distance "h" from the axis of said flow passage, and the relationship of these radii and distance is $$r = \sqrt{(rm^2) + (h)^2}$$

12. The gate valve of claim 11 wherein said end parts for connecting with a piping system are pipe flanges with equal radii "rf", and the radii "rf" of said flanges are substantially equal to the radius "r" of said central portion on said body.

13. The gate valve of claim 11 wherein the distance "h" is at least equal to the diameter "d" of said flow passage but not substantially greater than in the relationship of:

$$h = \sqrt{(2d)^2 - (rm)^2}$$

14. The gate valve of claim 12 wherein the relationship is $(rf)^2 = (rm)^2 + (h)^2$ between the several radii and the distance "h" at the planes of detachment.

15. The gate valve of claim 11 wherein said first closure member is tubular and includes a limited transverse chamber to accept substantial movement of said gate thereinto between opened and closed positions, said first closure member carrying a planar annular bearing surface at one end of said limited transverse chamber remote from said annular sealing surface thereon, a plurality of threaded fasteners extend from said annular bearing surface through said first closure member and then integrally secure into said body within said annular sealing surface, the maximum radius of said annular bearing surface being greater than the radius "rm" and said first closure member having a uniform transition in exterior surfaces between said annular bearing surface and said annular sealing surface on said body.

16. The gate valve of claim 15 wherein the radius of said central portion forming a spherical segment of said body decreases as a function from the center of said body with distance towards said end parts connected to a piping system.

17. In a through-conduit gate valve having a body containing a cylindrical flow passage extending therethrough between end parts for connecting said valve into a piping system; a transverse chamber through said body extending across said flow passage, and said chamber housing a gate moved transversely across said flow passage between open and closed positions, first and second closure members releaseably secured on annular sealing surfaces to said body for enclosing said chamber;

an elongated gate having parallel sides and shapes with a substantially rectangular cross section, and said gate having in longitudinal spaced relationship an imperforate portion and a perforate portion with an opening conforming to said flow passage;

said body carrying removable annular seats releaseably mounted in annular recesses about said flow passage and said seats engaging fluid tightly the parallel sides of said gate in its open and closed positions;

gate guide means in said body for controlling transverse and lateral movement of said gate between open and closed positions; and one of said closure members receiving said imperforate portion of said gate when in its open position;

the improvement comprising:

(a) a body with pipe flanges providing said end parts for connection in a piping system said body formed solely from a length of bar stock having a radius "rs" substantially equal to the radii "rf" of said flanges; and said flanges formed at the ends of said bar stock and coaxially with the flow passage having a diameter "d";

(b) said body having unitary gate guide means wherein said transverse chamber has a symmetrical obround cross section defined by parallel sides facing the sides of said gate and rounded ends adjacent to the edges of said gate;

(c) stepped counterboard providing annular recesses about said flow passages in said parallel sides; and annular seats removeably mounted within said counterbases;

(d) transverse semicylindrical grooves extending inwardly into said body from said transverse chamber and between said parallel sides and rounded ends, the intersection of said semicylindrical grooves with said rounded ends on a tangent providing strip guide surfaces for engaging the edges of said gate during its movement between opened and closed positions;

(e) said semicylindrical grooves extending into said stepped counterbores immediately adjacent to said transverse chamber whereby a tool can be inserted within said grooves to pry said annular seats from said counterbores and to displace said annular seats into said transverse chamber;

(f) said body having a central portion forming a spherical segment having a maximum radius "r" in a plane perpendicular to said flow passage, and the radii of said semispherical central portion decreasing as a function of distance from the center of said body towards said flanges; and said radius "r" is substantially equal to the radius "rf" of said flanges;

(g) said first and second closure members releaseably secured along planes of detachment upon flat annular sealing surfaces surrounding said transverse chamber, and said annular sealing surfaces being parallel to the axis of said flow passage and transverse to gate movement in said transverse chamber, said annular sealing surfaces having a maximum radius "rm" and spaced a distance "h" from said axis;

(h) said first closure member carrying a planar annular bearing surface of maximum radius "rb" at one end of a limited transverse chamber remote from said annular sealing surface thereon, and said limited chamber adapted to receive said gate thereinto during its movement between opened and closed positions, and said radius "rb" is greater than radius "rm" on said body; and (i) a plurality of threaded fasteners extending from said annular bearing surface through said first closure member and integrally secured into said body within said annular sealing surfaces.

18. The gate valve of claim 17 wherein the relationship between the several radii and distance "h" is $$h = \sqrt{(2d)^2 - (rm)^2}$$

19. The gate valve of claim 17 wherein the relationship between the several radii and the distance "h" includes $(rf)^2 = (rm)^2 + (h)^2$ 20. In a through-conduit gate valve having a body containing a cylindrical flow passage extending therethrough between end parts for connecting said valve into a piping system;

a transverse chamber through said body extending across said flow passage, and said chamber housing a gate moved transversely across said flow passage between open and closed positions, first and second closure members releaseably secured on annular sealing surfaces to said body for enclosing said chamber;

an elongated gate having parallel sides and edges with a substantially rectangular cross section, and said gate having in longitudinal spaced relationship an imperforate portion and a perforate portion with an opening conforming to said flow passage;

said body carrying movable annular seats releaseably mounted in annular recesses about said flow passage and said seats engaging fluid tightly the parallel sides of said gate in its open and closed positions;

gate guide means in said body for controlling transverse and lateral movement of said gate between open and closed positions; and one of said closure members receiving said imperforate portion of said gate when in its open position; the improvement comprising:

(a) said transverse chamber having in said body an obround cross section with parallel sides facing in close proximity the sides of said gate and rounded ends adjacent to the edges of said gate; and (b) parallel strip guide surfaces provided transversely to said flow passage directly on said body for engaging the edges of said gate, and said strip guide surfaces separating said rounded ends from said parallel sides.

21. The gate valve of claim 20 wherein transverse grooves extend into said body in parallel with said strip guide surfaces and between said strip guide surfaces and said parallel sides, and said transverse grooves at least in part intersect annular recesses in which are mounted said annular seats.

22. The gate valve of claim 21 wherein said transverse grooves and semicylindrical in cross section and said strip guide surfaces are on the tangent at the intersection of said transverse grooves and said rounded ends.

23. A through-conduit, double-wedging parallel-seat gate valve comprising;

(a) a monolithic body containing a cylindrical flow passage extending between pipe flanges for connecting the valve into a piping system;

(b) said body having a transverse chamber extending across said flow passage;

(c) a rectangular gate mounted within said transverse chamber and arranged to be moved transversely across said flow passage between opened and closed positions;

(d) said transverse chamber having an obround cross section with parallel sides as gate guides to the sides of said gate and rounded ends facing the edges of said gate;

(e) integral parallel strip guide surfaces on said body separating said rounded ends from said parallel sides, and said strip guide surfaces engaging as gate guides the edges of said gate;

(f) replaceable annular seats mounted in said annular recesses within said parallel sides and about said flow passage, and said seats engaging in fluid tightness the sides of said gate; and (g) upper and lower closure members releaseably secured to said body for receiving said gate in its movement between opened and closed positions.

24. In a through-conduit, double-wedging parallel seat gate valve having a body containing a cylindrical flow passage extending therethrough between end parts for connecting said valve into a piping system:

a transverse chamber through said body extending across said flow passage, and said chamber housing a gate moved transversely across said flow passage between open and closed positions, first and second closure members releaseably secured on annular sealing surfaces to said body for enclosing said chamber;

an elongated gate having parallel sides and edges with a substantially rectangular cross section, and said gate having in longitudinal spaced relationship an imperforate portion and a perforate portion with an opening conforming to said flow passage;

said body carrying removable annular seats releaseably mounted in annular recesses about said flow passage and said seats engaging fluid tightly the parallel sides of said gate in its open and closed positions;

gate guide means in said body for controlling transverse and lateral movement of said gate between open and closed positions; and one of said closure members receiving said imperforate portion of said gate when in its opened position; the improvement comprising:

(a) a rigid body with pipe flanges with radii "rf" providing said end parts for connection in a piping system, said body formed solely from a length of bar stock having a radius "rs" equal to the radii "rf" of said flanges;

(b) said flanges carried at the ends of said body and coaxial with said flow passage having a diameter "d";

(c) said transverse chamber having an obround cross section defined by parallel sides facing the sides of said gate and rounded ends adjacent to the edges of said gate;

(d) gate guide means carried on said body for guiding said gate in movement between opened and closed positions;

(e) stepped counterbores in said parallel sides about said flow passage forming said annular recesses;

(f) said annular seats having stepped diameter portion adapted to be mounted in said stepped counterbores;

(g) said body having central portion forming a spherical segment with a maximum radius "r" in a plane perpendicular to said flow passage; and said radius "r" is substantially equal to radius "rf";

(h) said first and second closure members releaseably secured along planes of detachment upon flat annular sealing surface surrounding said transverse chamber, said annular sealing surfaces being parallel to the axis of said flow passage, and said annular sealing surfaces having a maximum radius "rm" and spaced a distance "h" from said axis:

(i) said first and second closure members each carrying a flat annular bearing surface of maximum radius "rb", and said radius "rb" is greater than said radius "rm";

(j) said first and second closure members having limited transverse chambers adapted to receive said gate thereinto during its movement between opened and closed positions; and (k) a plurality of threaded fasteners extending from each said annular bearing surface at one end of said limited chambers remote from said annular sealing surfaces through said first and second closure members and integrally secured into said body within said annular sealing surfaces.

25. The gate valve of claim 24 wherein the relationship between the several radii and the distance "h" is $$h = \sqrt{(2d)^2 - (rm)^2}$$

26. The gate valve of claim 24 wherein the relationship between the several radii and the distance "h" is $(rf)^2 = (rm)^2 + (h)^2$.

27. The gate valve of claim 24 wherein said annular sealing surfaces have a minimum radius "ri", and said transverse chamber and gate are enclosed within a cylindrical envelope prescribed by the minimum radius "ri".

28. The gate valve of claim 24 wherein said annular sealing surfaces have a minimum radius "ri", and no portion of said chamber not concentric with said flow passage extends outside of a cylindrical envelope prescribed by the minimum radius "ri".

29. A through-conduit, double-wedging disc, parallel seat gate valve comprising:

(a) a monolithic body containing a cylindrical flow passage of a diameter "d", said flow passage extending between integral pipe flanges of radii "rf", and said pipe flanges connectable into a piping system;

(b) said body having a central portion forming a spherical segment with a maximum radius "r" in a plane perpendicular to said flow passage;

(c) first and second closure members releaseably secured along planes of detachment upon flat annular sealing surfaces parallel to said flow passage, and said annular sealing surfaces having a maximum radius "rm" and spaced a distance "h" from said flow passage axis;

(d) said body, and said first and second closure members having aligned transverse chambers therein to accommodate a gate moving between seats in said body from opened to closed positions;

(e) a rectangular gate mounted in guide means within said transverse chambers; and (f) said gate valve conforming to the relationships $$h = \sqrt{(2d)^2 - (rm)^2} \text{ and } (rf) = \sqrt{(rm)^2 + (h)^2}.$$

30. The gate valve of claim 29 wherein said first and second closure members each carry a flat annular bearing surface of maximum radius "rb", said radius "rb" is greater than said radius "rm" and a plurality of threaded fasteners extend from each said annular bearing surface through said first and second closure members and integrally secure into said body within said annular sealing surfaces.

* * * * *